June 23, 1953  F. HUNZIKER ET AL  2,643,132
INDEXING CHUCK

Filed Sept. 26, 1950  6 Sheets-Sheet 1

INVENTORS
FRED HUNZIKER
& LOUIS B. COURTOT
BY Richey + Watts
ATTORNEYS

June 23, 1953  F. HUNZIKER ET AL  2,643,132
INDEXING CHUCK
Filed Sept. 26, 1950  6 Sheets-Sheet 2
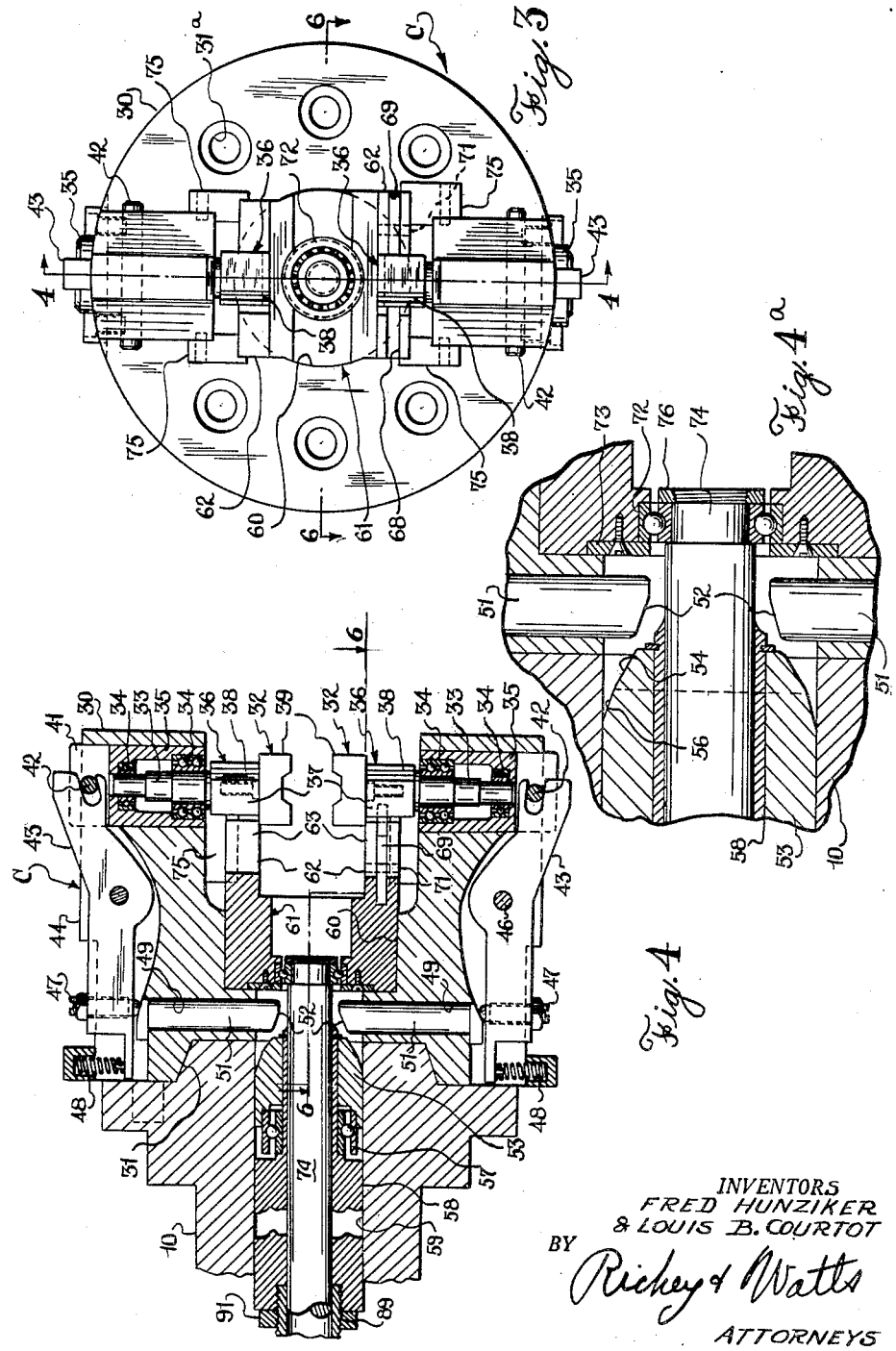
INVENTORS
FRED HUNZIKER
& LOUIS B. COURTOT
BY
Richey & Watts
ATTORNEYS

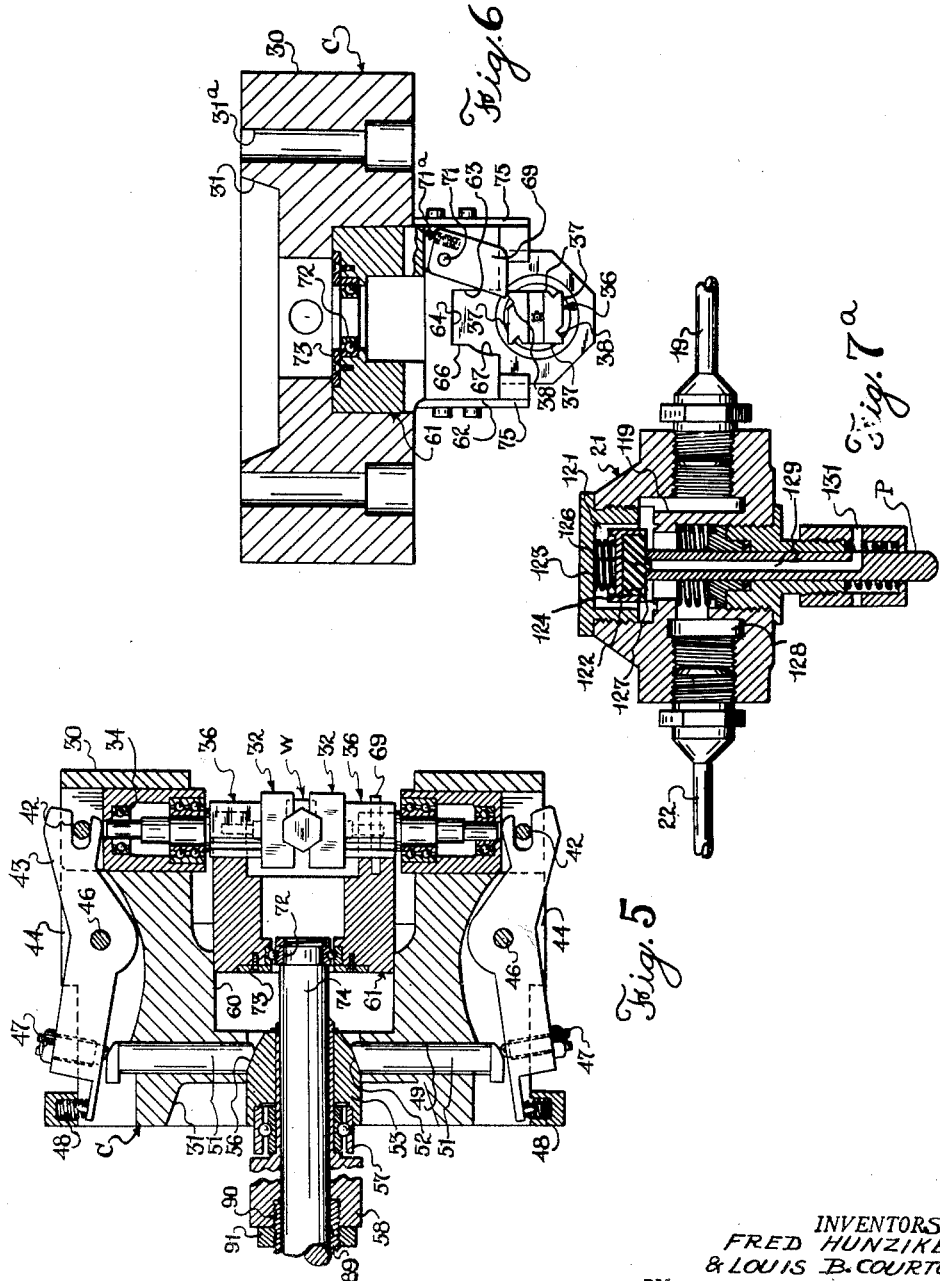

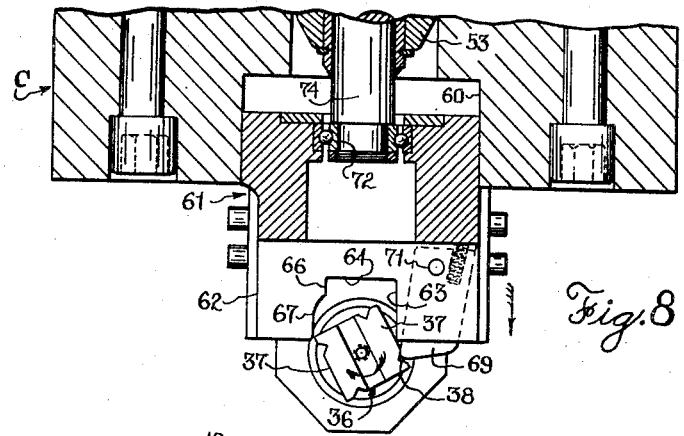

June 23, 1953  F. HUNZIKER ET AL  2,643,132
INDEXING CHUCK
Filed Sept. 26, 1950  6 Sheets-Sheet 6
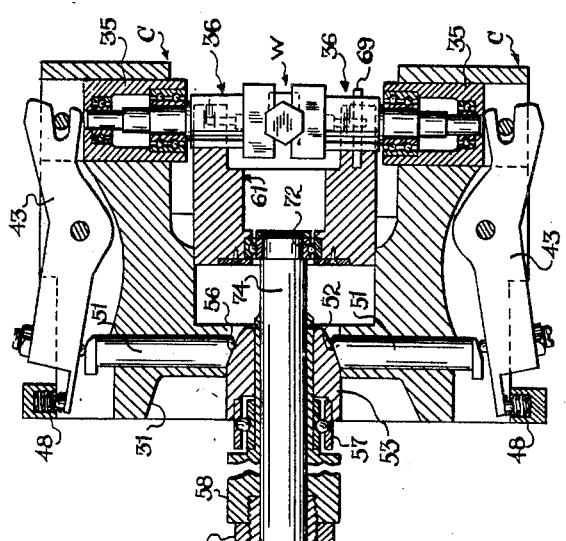
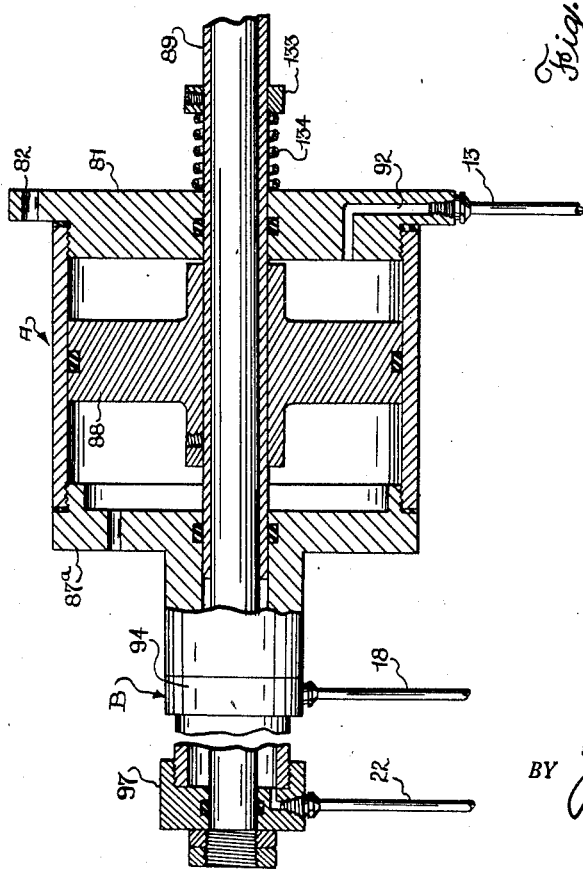
Fig. 11
INVENTORS
FRED HUNZIKER
& LOUIS B. COURTOT
BY
Richey & Watts
ATTORNEYS Patented June 23, 1953

2,643,132

UNITED STATES PATENT OFFICE 2,643,132

INDEXING CHUCK

Fred Hunziker, University Heights, and Louis B. Courtot, Cleveland, Ohio, assignors to The Weatherhead Company, Cleveland, Ohio, a corporation of Ohio Application September 26, 1950, Serial No. 186,846

11 Claims. (Cl. 279—5)

This invention relates to indexing chucks of the type applied to lathes and other machine tools.

Indexing chucks have been devised to facilitate multiple operations on lathes and other machine tools. For example, these chucks usually employ two or more radially movable jaws for gripping the work, which jaws are rotated about their axes through predetermined angles to present new faces or sides of the work to the tools. It is customary to operate the chucks by concentric collars, sleeves, or rods actuated by handcranks or cylinders or the like, the actuating mechanism rotating with the chuck.

Where it is desired to produce small pieces using these chucks and in other operations it is oftentimes desirable that the speed of rotation of the chuck be quite high. For example, speeds as high as 3,000 R. P. M. may be contemplated, and in some instances it is necessary that the chuck be quickly started and stopped as well as being capable of indexing motion without stopping the rotation of the chuck. Where high speeds and quick stops and starts are required due to the operation being performed or the nature of the machine in which the chuck is mounted, the rotational inertia of prior chucks has been such as to preclude, or at least make difficult, such stopping and starting.

A principal object of the invention is to reduce the rotational inertia of a remote control indexing chuck, and to make a chuck of a given nominal capacity more compact in order that it may fit into various machine tools where space is at a premium. The aforesaid objects are accomplished by providing axially aligned cylinders disposed on the axis of rotation of the chuck and fixed to the frame of the machine tool. Concentric piston rods connect to the pistons within the cylinders and extend to the jaw-opening and indexing mechanisms of the chuck. By providing rotary joints at the chuck end of the piston rods, neither the cylinders nor the piston rods themselves rotate during operation of the machine, whereby the rotational inertia of the indexing chuck is reduced substantially to a minimum, and is little or no greater than the rotational inertia of such a chuck which is arranged entirely for manual operation. This construction likewise greatly facilitates the construction of a compact chuck because the concentric piston rod arrangement lends itself to a compact and simple design for the chuck-actuating mechanism.

Another object resides in facilitating the opening of the jaws by fluid pressure, such as compressed air or the like. This is accomplished by relieving the pressure of the indexing air cylinder or other fluid cylinder from the jaw mechanism as the jaw-opening valve is manipulated. To attain this result a special or auxiliary valve is interconnected with the jaw-opening valve and opens the portion of the indexing cylinder that urges the indexing mechanism to its locked position to atmosphere.

Another object resides in providing a positive and rugged positioning mechanism for the jaws of a chuck or, in the broader aspects of the invention, a fixture, so that they will always assume the same indexed position. This is accomplished by arranging the indexing mechanism so that it is actuated by a reciprocating slide with the indexing rotation being completed before reciprocation of the slide is completed. Thus, the slide can be notched to grip the indexing wheel on laterally-opposed surfaces, thereby positively preventing rotation or shake of the wheel in either direction.

Another object resides in insuring that the jaws are not open during rotation of the chuck even if fluid pressure is removed from the jaw-opening and closing cylinder. This may be accomplished by employing a cam on the piston rod for urging the jaws in their closed position, which cam has a surface that is, in effect, irreversible. A spring may also be employed to close the chuck either with or without the assistance of fluid pressure with which construction there is no tendency for the jaws to open at any time under forces normally encountered.

The manner in which these and other objects and advantages are accomplished will be apparent from the following detailed description of a preferred embodiment of the invention.

In the drawings:

Fig. 3 is a front view of the chuck;

Fig. 4 is a section taken on 4—4 of Fig. 3;

Fig. 4a is an enlarged fragmentary detail showing the cam construction;

Fig. 5 is a section like Fig. 4 showing the jaws closed;

Fig. 6 is a section taken on 6—6 of Fig. 4;

Fig. 7a is an enlarged view of the bleeder valve showing the details of construction;

Figs. 8 to 10 are step-by-step views showing the indexing operation; and,

Fig. 11 shows a modified form wherein the jaws are closed by a spring.

General installation

Figure 2:
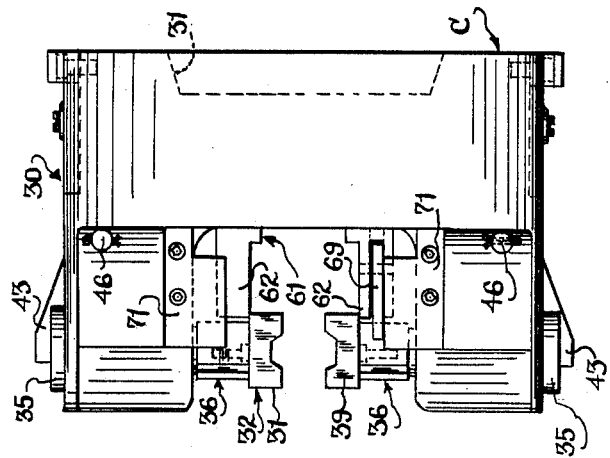
Fig. 2 is a side elevation of the chuck.
Figure 1:
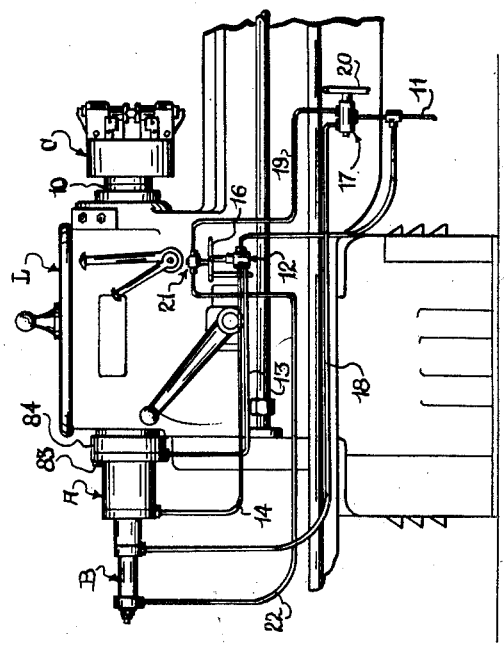
Fig. 1 is a diagrammatic illustration of the installation of a chuck and actuating mechanism on a typical lathe.

A typical installation on a commercial lathe is illustrated somewhat diagrammatically in Fig. 1. Here can be seen the lathe L, the chuck C, and the actuating cylinders A and B for the chuck mechanism. The chuck is mounted for rotation on the usual lathe spindle 10. A typical arrangement of the fluid lines and valves is also shown in Fig. 1. Line 11 is for connection to a source of fluid under pressure such as compressed air. A jaw-opening and closing control valve 12 is connected to the pressure line and has leading therefrom lines 13 and 14 directed to opposite ends of the cylinder A to cause reciprocation of the piston therein and opening and closing of the chuck jaws. Valve 12 is controlled by a manual lever 16 which may be disposed in any suitable manner so long as it is convenient to the operator.

An indexing control valve 17 is likewise connected to the pressure line 11 and has one line 18 leading therefrom directed to one end of the indexing piston and cylinder B, and another line 19 directed to an automatic bleeder valve 21. The valve 17 is controlled by suitable lever 20 which may be arranged by means not shown so that the operator may employ his knee to cause the chuck to index. A line 22 leads from the bleeder valve 21 to the other end of the indexing cylinder B. The construction of valves 12 and 21 will be explained in detail presently, their arrangement being such that locking pressure of the indexing mechanism is removed before pressure is directed to open and close the jaws.

Jaw-opening and closing mechanism

The construction of the chuck representing the preferred embodiment of the invention will now be described. The chuck C (as best seen in Fig. 4) has a recess 31 for receiving the nose of the spindle 10, and bolt holes 31a (appearing in Fig. 3) pass through the body of the chuck for bolting the latter to the spindle. The chuck jaw assembly is illustrated generally at 32 and includes a shank 33 mounted in bearings 34 for rotation about a radial axis, the bearings being fitted to plungers 35 sliding in suitable bores in forward extensions of the chuck body, for opening and closing motion along a radial axis. On each shank is mounted a locating or indexing wheel 36 which, as seen in Fig. 6, has laterally-opposed pairs of parallel surfaces 37, the preferred embodiment being such that the wheel is in the form of a square section. Each surface 37 is formed with a notch 38 for engagement by an indexing pawl.

The plungers 35 are slotted as at 41 and provided with pins 42 for the reception of the notched end of jaw-actuating levers 43, these levers being disposed in slots 44 milled in the chuck body and pivoted by means of pivot pins 46. Adjustable abutment screws 47 are threaded into the levers 43 and a spring assembly 48 urges the abutment screws against radial plungers 51 sliding in bores 49 in the chuck body. The inner end of the plungers are formed with bevelled or cam surfaces 52 for engaging the nose 53 of a jaw-closing cam. As seen in Fig. 4a, cam 53 has two conical surfaces, a steep surface 54, and a flatter surface 56. With this construction surface 54 effects initial closing of the jaws, but before the work W is fully gripped surface 56 slides under plunger surfaces 52 and effects a powerful gripping action against the work. The inclination angle of cam surface 56 is so small that the system is irreversible, that is, virtually no pressure encountered in ordinary operation tending to spread the jaws 39 will be strong enough to overcome the friction of the system and force the cam 53 to the left in the figures.

The cam 53 is rotatably mounted by means of a bearing 57 carried by a plunger 58, the entire assembly sliding in an axial bore 59 formed in the spindle 10. Thus, reciprocation of the cam 53 to the right in Figs. 4 and 5 causes the jaws to close and clamp the work W, as seen in Fig. 5. Motion of the cam 53 to the left to the position shown in Fig. 4 permits the jaws to open under the force of springs 48.

Chuck indexing mechanism

The indexing mechanism with the preferred embodiment of the invention is exceptionally simple and rugged. It is mounted in an axial bore 60 in the chuck body. In this bore is a plunger 61 which reciprocates rearwardly for releasing the jaws and forwardly for indexing them. The plunger 61 is machined to provide two spaced parallel projections 62, these projections each being notched for embracing the locating or indexing wheels 36. As seen in Figs. 6 and 8 to 10, each notch has a straight surface 63, a rear surface 64, a lateral surface 66 spaced from surface 63 by a distance equal to the spacing of opposed surfaces 37 of the indexing wheels, and a relieved portion 67. At least one of the projections 62 is notched as at 68 for reception of an indexing pawl 69, the latter being pivoted on pins 71 and urged toward the indexing wheel by a spring 71a.

In order to provide for reciprocation of the plunger 61, a bearing 72 is retained in the plunger by a cap 73 screwed thereto, and a piston rod 74 is attached to the inner bearing race, such rod being telescoped within the cam 53 as well as the member 58 that actuates the jaw-opening and closing mechanism. As best seen in Fig. 3, guide blocks 75 are fastened to the chuck body and engage suitable surfaces on the plunger 61, thereby serving to prevent rotation of such plunger with respect to the body.

Operation of indexing mechanism

The various steps in the indexing action will be most clear from examination of Figs. 6, 8, 9, and 10. Assume that the piston rod 74 is retracted to its rearward position, or the left as seen in Figs. 4 and 6. Pawl 69 will now be in a position to engage a rearward surface 37 of the indexing wheel 36 adjacent a notch 38. As the plunger 61 is moved forwardly on the indexing structure pawl 69 starts rotation of the wheel and soon falls into the associated notch 38 causing the indexing wheel 36 to rotate as indicated by the arrow in Fig. 8. Indexing motion continues under action of the pawl until the parts assume the position shown approximately in Fig. 8, whereupon the corner forming the outer edge of surface 63 bears against the wheel and assists the pawl in applying the indexing force. The combined indexing action continues until the wheel substantially reaches its index position, at which time the indexing is completed by the corner of surface 63, the parts thereupon being positioned as shown in Fig. 9. Now straight surface 63 is in engagement with one of opposed surfaces 37 on the indexing wheel and the latter is therefore maintained in its indexing position. Relief surface 67 permits the indexing to occur as described.

The surfaces 64 and 66 have not yet engaged the indexing wheel in Fig. 9, but it can be seen that these surfaces, in conjunction with straight surfaces 63, form a three-sided pocket which receives corresponding surfaces of the wheel when indexing is completed, as seen in Fig. 10. Thus, both the lateral surfaces and the rearward surface cooperate to positively lock the indexing wheel against rotation in either direction after the indexing cycle is completed. Due to this type of engagement, rotating forces applied to the work do not tend to cause the plunger 61 to retract or be cammed back, and any steady force applied to the plunger, even if it be relatively small, tends to hold the plunger 61 against the wheel and is sufficient to firmly and positively hold and locate the work. Since the two indexing wheels are operatively connected by the work when the jaws are closed, only one indexing pawl need be provided, but, of course, if desired a second pawl could be arranged for acting upon the other of the two wheels. Thus, it can be seen that the jaw-opening and closing mechanism and the indexing mechanism are simple and rugged and readily adapted to actuation by a pair of concentric actuators mounted along the chuck axis, which actuators need not rotate.

Actuator system

Figure 7:
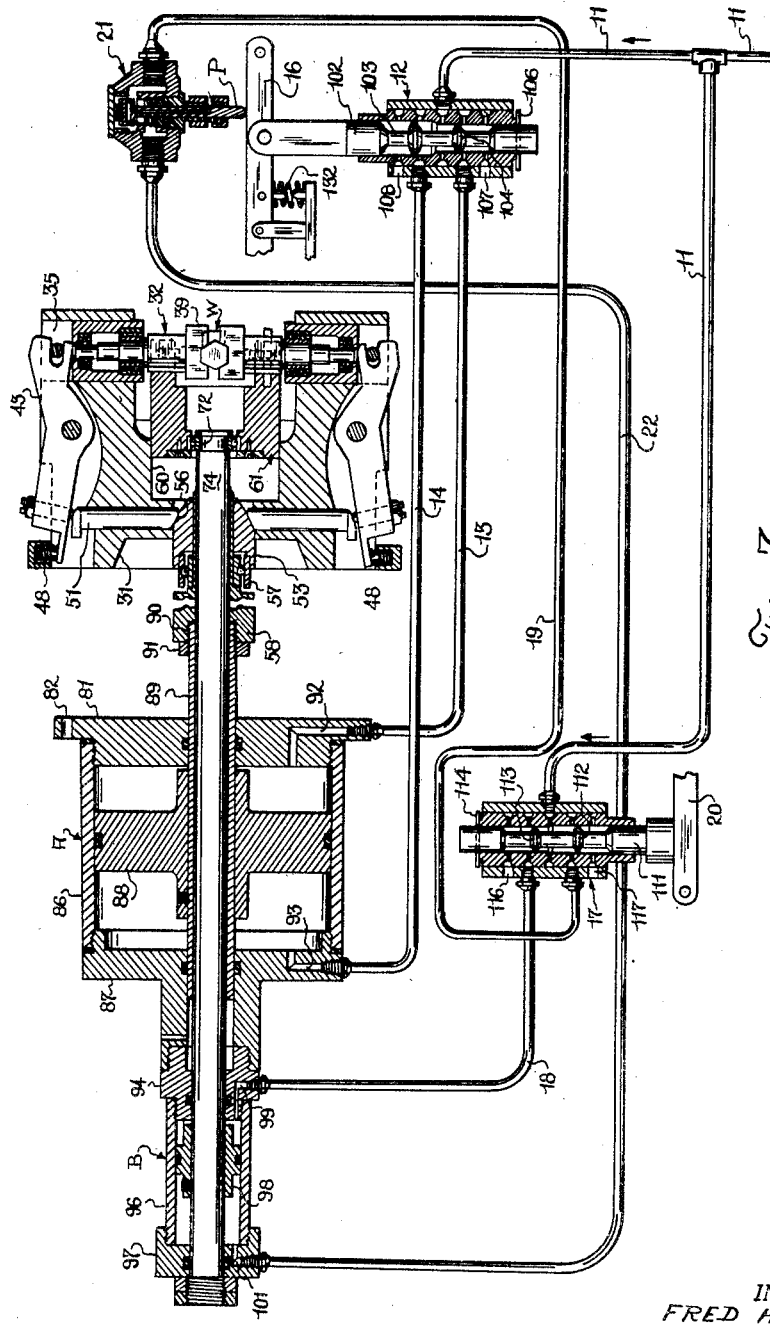
Fig. 7 is a diagram showing the chuck-actuating mechanism and air connections.

Details of the actuator system for the chuck appear in Figs. 7 and 7a. The basic connections have been described in connection with Fig. 1, and except for the orientation of the valves the same connections are disclosed in Fig. 7. In order to operate the jaw-opening and closing construction, member 58 is operatively connected to the piston and cylinder assembly A. This assembly includes a flange 81 forming one end of the cylinder and provided with bolt holes 82 for attachment of the flange by means of bolts 83 (seen in Fig. 1) to a fixed portion 84 at the rear of the lathe. The cylinder body 86 is threaded to flange 81 and also to the opposed cylinder head for flange 87. A piston 88, provided with suitable seals, is attached to a sleeve 89, which surrounds the rod 74, and is threaded as at 90 to the member 58 which reciprocates the jaw-closing cam 53. A lock nut 91 may be provided for this joint. The flanges 81 and 87 are provided with bores 92 and 93, respectively, for connection to the lines 13 and 14 leading from the valve 12.

The mechanical construction of the indexing cylinder assembly B is seen in Fig. 7. Here one cylinder cap 94 is threaded to a projection of flange 87 and to a cylinder sleeve 96 which mounts the end cap 97. The piston 98 is fastened to the piston rod 74 for reciprocation of the indexing plunger 61. Bores 99 and 101 are formed in the cylinder caps for admitting fluid under pressure to opposite sides of the piston 98.

The jaw-opening and closing control valve 12 is best seen to the right of Fig. 7. It includes a plunger 102 having lands 103 and 104 mounted in bores formed in the body of the valve. The valve includes ports connecting to inlet line 11 and outlet lines 13 and 14. Land 103 is of larger diameter than land 104 so that pressure from line 11 tends to hold the valve in the upper (jaw-closing) position shown in the drawings, the pin 106 mounted in the plunger acting as a stop. The valve includes atmospheric ports 107 and 108 to respectively unblock the nonactive side of the piston 88. With the valve in the position shown in the drawings, pressure is directed to line 14 urging the piston to the right in Fig. 7 and thereby holding the jaws closed. The other side of the piston is vented to atmosphere through lines 13 and port 107. When the operating handle 16 is depressed the connections are reversed and the fluid under pressure passes to line 13 causing retraction of the cam 53 permitting the springs 48 to open the jaws. The other side of the piston is then vented to atmosphere by port 108.

A valve 21 is provided to release the indexing pressure of surface 64 against the indexing wheel (see Fig. 10) so that the jaws can partake of their radial motion without undue wearing of the mating surfaces. This relief of pressure vents the pressure to the left of piston 98 before the jaws are caused to open, even though the indexing valve 17 is normally disposed to hold the jaws in their indexed position. Indexing valve 17 has a plunger 111, large and small lands 112 and 113, stop 114, and vent ports 116 and 117 similar to those described for valve 12.

With the valve in the position shown in Fig. 7, pressure is directed to line 19 through the valve 21 and line 22 to the left of piston 98 to hold the plunger 61 forward. The differential pressure on lands 112 and 113 hold the valve in this position. If the plunger 111 is lifted as seen in the drawings, pressure is directed to the other side of the piston causing retraction of the plunger. This may be accomplished by a momentary deflection of lever 20 by the operator. Upon release of lever 20, differential pressure returns the valve to the position shown, and the forward stroke of the plunger is initiated.

The internal construction of the bleeder valve 21 can be seen from examination of Fig. 7a. It will be assumed that the parts are in the position shown in Fig. 7 with pressure from line 19 being directed to line 22 to hold the indexing mechanism. Line 19 connects with an inlet chamber 119 that communicates with an upper chamber 121 in which is mounted the valve disc 122 urged downwardly by a spring 123 and carrying a sealing member 124. Member 124 has a central button 126 and may make sealing engagement with the valve seat 127, thereby blocking communication between the inlet chamber 119 and an outlet chamber 128 communicating with the outlet line 22. The plunger P slides in the valve body and has a central bore 129 which may be closed at its free end by button 126, and which communicates with atmosphere at the other end by means of a port 131 in the body.

With the handle 16 in its normal position (as seen in Fig. 7) plunger P is lifted by the differential air pressure effect by the lands in valve 12 as well as by a spring 132 which may be provided on the manual handle mechanism. This is the normal position wherein pressure is applied directly to the left of indexing piston 98, as seen in Fig. 7. If handle 16 is depressed to direct pressure to the right of piston 88 for permitting opening of the jaws, the initial motion of the handle permits spring 123 to seat valve 122 against seat 127, thereby blocking communication between lines 19 and 22. Because of bore 129 in the plunger P, atmospheric pressure is now established on the underside of valve 122 and fluid pressure in chamber 119 and 121 holds valve 122 in its closed position due to the differential pressure effect. No holding force on plunger 61 is exerted, but such force is restored when handle 16 is permitted to return to its upper position causing the valve parts to assume the relationships shown in Fig. 7a.

Having completed a detailed description of a preferred embodiment of the invention, it will be apparent that we have made possible the operation of chucks at high speeds with quick starting and stopping due to the fact that the actuating mechanism is substantially nonrotatable. Also, the concentric construction of the actuators, and the nature of the indexing arrangement which facilitates making the chucks small in diameter, cooperate to produce a chuck and actuating system that has a comparatively small rotational inertia; yet, the ruggedness of the construction leaves nothing to be desired.

*Modified form*

In the system shown in Fig. 7, fluid under pressure is employed to hold the jaws in their closed position against the work. However, as seen in Fig. 11 showing the modified form, because of the nature of the cam surfaces on members 53 and 51, it is possible to make the piston and cylinder assembly A single-acting by omitting fluid ports and connections to the end cap 87a. A collar 133 is then mounted on the sleeve 89 and serves to receive the force of a spring 134 which surrounds the sleeve and bears against the flange 81. Thus, the jaws are closed by spring action rather than by fluid pressure, and under such circumstances the function of the bleed valve 21, which is preferably connected into this system just as shown in Fig. 7, assumes additional importance because it insures action of the jaws even though the spring 134 does not have an exceptionally high rate. Otherwise the system in Fig. 11 is like that just described, and reference to the other figures is made for the details of the other parts.

Having completed a detailed description of our invention and a preferred embodiment thereof, it will be understood by those skilled in the art that various modifications having the mode of operation of the invention may be made, and, accordingly, we contemplate that the appended claims and not the aforesaid embodiment be determinative of the scope of our invention.

What is claimed is:

1. An indexing chuck and actuator therefor comprising a chuck body, means formed on said body for mounting it on the rotatable spindle of a machine tool, a plurality of work-gripping jaws mounted for radial motion on said body, means mounted on said body for opening and closing said jaws, said jaws being rotatably mounted on said body for indexing, means for indexing said jaws, a pair of cylinders having axes coincident with the rotational axis of said chuck body, pistons in said cylinders, concentric non-rotatable relatively slidable piston rods each connected to a piston, said piston rods extending respectively to said jaw-opening and indexing means, and means for nonrotatably mounting said cylinders on the frame of the machine tool.

2. An indexing chuck and actuator therefor comprising a chuck body, means formed on said body for mounting it on the rotatable spindle of a machine tool, a plurality of work-gripping jaws mounted for radial motion on said body, means mounted on said body for opening and closing said jaws, said jaws being rotatably mounted on said body for indexing, means for indexing said jaws, a pair of cylinders attached together with their axes coincident with the rotational axis of said chuck body, pistons in said cylinders, a hollow piston rod connected to the piston in the cylinder nearest said chuck, a piston rod extending through said hollow piston and connected to the piston in the other cylinder, said piston rods being connected to said jaw-opening and indexing means, and means for nonrotatably mounting said cylinders on the frame of the machine tool.

3. An indexing chuck and actuator therefor comprising a chuck body, means formed on said body for mounting it on the rotatable spindle of a machine tool, a plurality of work-gripping jaws mounted for radial motion on said body, means mounted on said body for opening and closing said jaws, said jaws being rotatably mounted on said body for indexing, means for indexing said jaws, a pair of cylinders having axes coincident with the rotational axis of said chuck body, pistons in said cylinders, concentric relatively slidable piston rods each connected to a piston, said piston rods extending respectively to said jaw-opening and indexing means, a rotating joint between the ends of the piston rods and said jaw-actuating means, and means for nonrotatably mounting said cylinders on the frame of the machine tool.

4. An indexing chuck and actuator therefor comprising a chuck body, means formed on said body for mounting it on the rotatable spindle of a machine tool, a plurality of work-gripping jaws mounted for radial motion on said body, means mounted on said body for opening said jaws including radial plungers, a cam for spreading said plungers, said jaws being rotatably mounted on said body for indexing, axially-reciprocable means on said body for indexing said jaws, a pair of cylinders having axes coincident with the rotational axis of said chuck body, pistons in said cylinders, concentric relatively slidable piston rods each connected at one end to a piston, the other end of one of said piston rods being rotatably connected to said cam, the other end of the other of said piston rods being rotatably connected to said axially-reciprocating indexing means, and means for nonrotatably mounting said cylinders on the frame of the machine tool.

5. An indexing chuck and actuator therefor comprising a chuck body, means formed on said body for mounting it on the rotatable spindle of a machine tool, a plurality of work-gripping jaws mounted for radial motion on said body, means mounted on said body for opening and closing said jaws, said jaws being rotatably mounted on said body for indexing, means for indexing said jaws, a pair of cylinders having axes coincident with the rotational axis of said chuck body, pistons in said cylinders, a sleeve connected to the piston of the cylinder nearest said chucks, a piston rod slidable in said sleeve and connected to the other piston, said sleeve and piston rod extending respectively to said jaw-opening and indexing means, a rotating joint between the ends of the sleeve and piston rod and said jaw-actuating means, and means for nonrotatably mounting said cylinders on the frame of the machine tool.

6. An indexing chuck comprising a body, a plurality of work-gripping jaws mounted for radial motion on said body, means mounted on said body for opening and closing said jaws, said jaws being rotatable on said body about a radial axis for indexing, a locating wheel on each jaw having a pair of laterally-opposed surfaces for each indexed position, at least one of said wheels being formed with shoulder means for indexing, a plunger centrally mounted on said chuck body for axial reciprocation, said plunger having forward projections notched to snugly engage the opposed surfaces of said locating wheels, a pawl on one of said projections to engage said index wheel upon outward motion of said plunger, said pawl and wheel being formed to complete an indexing cycle before said plunger completes its forward stroke, the notches in said projections engaging the opposed surfaces of said wheels to lock the same upon completion of the forward stroke of said plunger, and means to reciprocate said plunger.

7. An indexing chuck and actuator therefor comprising a chuck body, means formed on said body for mounting it on the rotatable spindle of a machine tool, a plurality of work-gripping jaws mounted for radial motion on said body, jaw-actuating means mounted on said body for opening and closing said jaws, said jaws being rotatably mounted on said body for indexing, means for indexing said jaws, a jaw-actuating piston and cylinder assembly and a jaw-indexing piston and cylinder assembly, means connecting the jaw-actuating piston to said jaw-actuating means and the jaw-indexing piston to said jaw and indexing means, a jaw-opening control valve, a first line from said valve to the jaw-actuating cylinder connected so as to cause the piston to move to open said jaws, a jaw-indexing control valve, a second line between said latter valve and said jaw-indexing cylinder connected so as to cause said jaw-indexing cylinder to engage and hold one of said jaws against rotation, means to bleed said second line to atmosphere upon actuation of said jaw-opening control valve, and means for mounting said cylinders on the frame of the machine tool.

8. An indexing chuck and actuator therefor comprising a chuck body, means formed on said body for mounting it on the rotatable spindle of a machine tool, a plurality of work-gripping jaws mounted for radial motion on said body, jaw-actuating means mounted on said body for opening and closing said jaws, said jaws being rotatably mounted on said body for indexing, means for indexing said jaws, a jaw-actuating piston and cylinder assembly and a jaw-indexing piston and cylinder assembly, means connecting the jaw-actuating piston to said jaw-actuating means and the jaw-indexing piston to said jaw and indexing means, a jaw-opening control valve, a first line from said valve to the jaw-actuating cylinder connected so as to cause the piston to move to open said jaws, a jaw-indexing control valve, a second line between said latter valve and said jaw-indexing cylinder connected so as to cause said jaw-indexing cylinder to move on its index stroke, a bleeder valve in said last-named line, means connecting said bleeder valve to said jaw-opening control valve, said bleeder valve opening said second line to atmosphere upon actuation of said jaw-opening control valve, and means for mounting said cylinders on the frame of the machine tool.

9. An indexing chuck and actuator therefor comprising a chuck body, means formed on said body for mounting it on the rotatable spindle of a machine tool, a plurality of work-gripping jaws mounted for radial motion on said body, jaw-actuating means mounted on said body for opening and closing said jaws, said jaws being rotatably mounted on said body for indexing, means for indexing said jaws, a jaw-actuating piston and cylinder assembly and a jaw-indexing piston and cylinder assembly, means connecting the jaw-actuating piston to said jaw-actuating means and the jaw-indexing piston to said jaw and indexing means, a jaw-opening control valve, a first line from said valve to the jaw-actuating cylinder connected so as to cause the piston to move to open said jaws, a jaw-indexing control valve including manual operating means, a second line between said latter valve and said jaw-indexing cylinder connected so as to cause said jaw-indexing cylinder to move on its index stroke, a bleeder valve in said last-named line, means connecting said bleeder valve to the manual operating means of said jaw-opening control valve, said bleeder valve opening said second line to atmosphere upon actuation of said jaw-opening control valve, and means for mounting said cylinders on the frame of the machine tool.

10. An indexing chuck comprising a body, a plurality of work-gripping jaws mounted for radial motion on said body, means mounted on said body for opening and closing said jaws, first piston and cylinder assembly connected to said means, said jaws being rotatable on said body about a radial axis for indexing, a locating wheel on each jaw having a pair of laterally-opposed surfaces for each indexed position, at least one of said wheels being formed with shoulder means for indexing, a plunger centrally mounted on said chuck body for axial reciprocation, said plunger having forward projections notched to snugly engage the opposed surfaces of said locating wheels and a rearward surface to engage said wheel, a pawl on one of said projections to engage said index wheel upon outward motion of said plunger, said pawl and wheel being formed to complete an indexing cycle before said plunger completes its forward stroke, the notches and rearward surfaces on said projections engaging the surfaces of said wheels to lock the same upon completion of the forward stroke of said plunger, second piston and cylinder means to reciprocate said plunger, and means to release pressure on said means tending to lock said wheels upon actuation of said first piston and cylinder means to open said jaws.

11. An indexing work-holding fixture comprising a body, a plurality of work-gripping jaws mounted for radial convergent and divergent motion on said body, means mounted on said body for opening and closing said jaws, said jaws being rotatable on said body about a radial axis for indexing, a locating wheel on each jaw having a pair of laterally-opposed surfaces for each indexed position, at least one of said wheels being formed with shoulder means for indexing, a plunger centrally mounted on said chuck body for axial reciprocation, said plunger having forward projections notched to snugly engage the opposed surfaces of said locating wheels, a pawl on one of said projections to engage said index wheel upon outward motion of said plunger, said pawl and wheel being formed to complete an indexing cycle before said plunger completes its forward stroke, the notches in said projections engaging the opposed surfaces of said wheels to lock the same upon completion of the forward stroke of said plunger, and means to reciprocate said plunger.

FRED HUNZIKER.
LOUIS B. COURTOT.

References Cited in the file of this patent

UNITED STATES PATENTS

| Number | Name | Date |
|---|---|---|
| 1,010,616 | Gottschalk | Dec. 5, 1911 |
| 1,441,088 | Hofschalk | Jan. 2, 1923 |
| 1,801,602 | Hunziker | Apr. 21, 1931 |
| 1,833,822 | Brown | Nov. 24, 1931 |
| 2,349,119 | Soule | May 16, 1944 |
| 2,362,071 | Hunziker | Nov. 7, 1944 |
| 2,362,072 | Hunziker | Nov. 7, 1944 |
| 2,502,260 | Hunziker | Mar. 28, 1950 |